May 2, 1939. H. A. KROENLEIN 2,156,857

VACUUM CLEANER FILTER

Filed Aug. 3, 1936

INVENTOR.
Henry A. Kroenlein
BY Fay, Oberlin & Fay
ATTORNEYS

Patented May 2, 1939

2,156,857

UNITED STATES PATENT OFFICE 2,156,857

VACUUM CLEANER FILTER

Henry A. Kroenlein, East Cleveland, Ohio, assignor to Progress Vacuum Corporation, Cleveland, Ohio, a corporation of Ohio Application August 3, 1936, Serial No. 94,031

3 Claims. (Cl. 183—51)

The present invention, relating as indicated to a vacuum cleaner filter, has more particular reference to a filtering means for removing and collecting extremely fine dirt and dust particles, and entrained bacteria and similar microscopic organisms from the air circulated through a vacuum cleaner.

The general object and nature of the invention is to provide such a bacteria filter which can be manufactured at relatively low cost and which can therefore be discarded and replaced by a new one after the period of its useful life has expired. Another object is to provide a filtration medium in the filter having improved adsorptive and retaining properties and which will efficiently remove the fine dust particles and bacteria from the passing air stream and at the same time will not appreciably obstruct the air stream so as to decrease the vacuum pressure. Still another object of the invention is to provide means whereby the bacteria filter may be conveniently and quickly inserted in the vacuum cleaner assembly and removed therefrom. Additional objects and advantages of the invention shall become apparent as the following description proceeds.

To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

Figure 1:
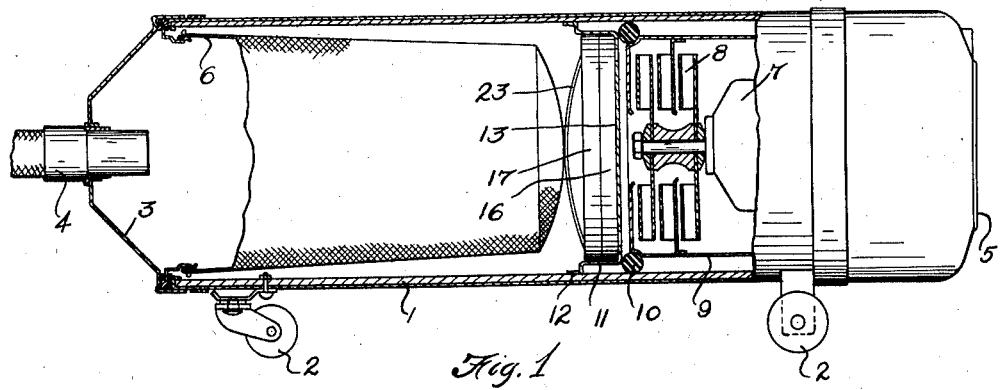
Figure 2:
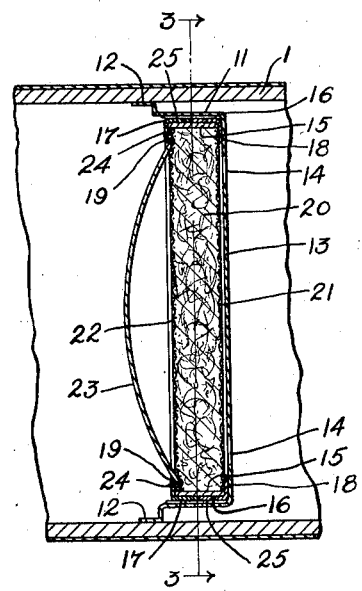
Figure 3:
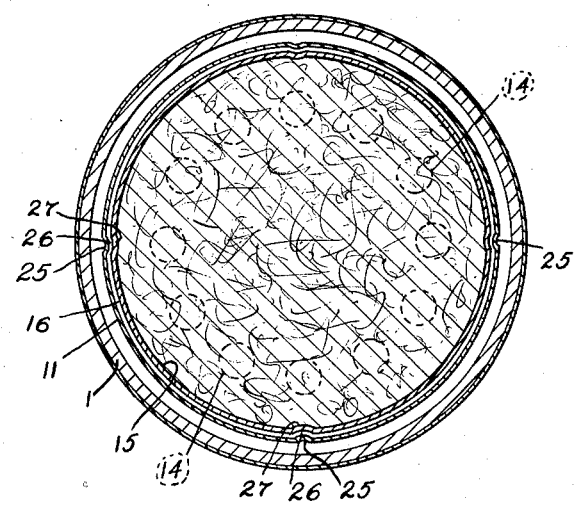
Figure 4:
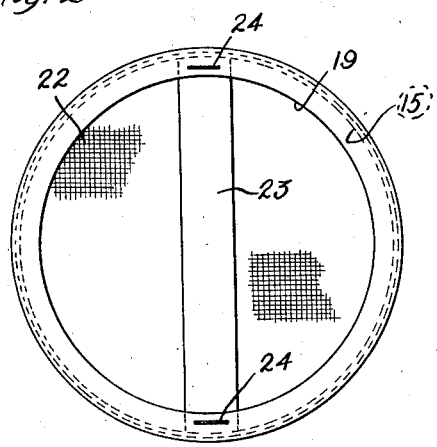

In said annexed drawing:

Fig. 1 is an elevational view of a vacuum cleaner, partially in section, showing the filter constructed according to the principle of my invention incorporated therein; Fig. 2 is an enlarged sectional view of the bacteria filter; Fig. 3 is a sectional view taken upon a plane normal to that of Fig. 2 and substantially along line 3—3 thereof; Fig. 4 is a front plan view of the filter.

Now referring more particularly to the drawing, there is shown therein a cylindrical vacuum cleaner housing 1 supported upon the wheels 2. The front end of the vacuum cleaner housing 1 carries a cover plate 3 in which there is mounted the vacuum cleaner hose fitting 4 for the vacuum inlet. The vacuum outlet or exhaust is located in the opposite end of the vacuum cleaner housing 1 in the other cover plate 5. A fabric filter bag 6 is carried in the inlet end of the vacuum cleaner adjacent the end of the hose fitting 4.

The bag 6 is adapted to collect the ordinary dust and dirt particles entrained in the incoming stream of air.

An air propelling means consisting of the electric motor 7 and the air impeller blades 8 is mounted in the housing 9 which is supported in the vacuum cleaner housing 1 by a resilient mounting such as the rubber ring 10.

A cup shaped stamping 11 is mounted between the end of the dust filter bag 6 and the intake side of the motor and fan housing 9. The cup shaped member 11 has the offset flange portion 12 which fits against and is mounted upon the inner wall of the vacuum cleaner housing 1. The transverse wall 13 of the cup shaped member 11 has a plurality of openings 14 for the passage of the air stream.

The bacteria filter which is mounted in the cup shaped member 11, consists or a cylindrical side wall portion 15 over which the two outer flanged members 16 and 17 are adapted to telescopically fit. The outer wall or casing members 16 and 17 of the bacteria filter have the inwardly exending flanges 18 and 19 respectively.

The interior of the bacteria filter is filled with a filtration medium 20 composed of a fine, loosely packed fibrous material such as wool batting which has been treated with a suitable substance adapted to increase the adsorptive and retaining powers of the fibers, and which will remain permanently tacky or sticky so that fine particles and bacteria passing through the filtration medium will adhere thereto. Wool batting has been found particularly desirable as a filtration medium for my filter, since its fibers are capable of retaining their resilient properties and will not become compacted and hard packed after a period of use.

A suitable substance for coating the wool batting in order to render the surface of its fibers permanently sticky, or of an adhesive nature, is an aroclor, or chlorinated biphenyl. The aroclor is dissolved in carbon tetrachloride and applied to the wool batting by dipping or spraying. Upon evaporation of the solvent, carbon tetrachloride, the aroclor remains as a sticky or adhesive coating on the wool fibers. A synthetic resin, mixed with mineral oil, may also be used for adhesively coating the fibers of the filtration medium.

The wool batting 20 is retained within the open sides of the filter housing by means of the wire screens 21 and 22 positioned adjacent the inner faces of the flanges 18 and 19 respectively.

A handle 23 extends diametrically across one side of the filter and has each end attached to the flange 19 by means of wire staples 24. The handle 23 is offset from the surface of the filter and is adapted to contact with the end of the dust filter bag 6 and to thereby prevent the latter from bearing against the surface of the filter, which might otherwise occur after the dust bag 6 has been in use for a period of time and has become stretched.

The wall 15, the outer flanged members 16 and 17, constituting the filtering casing and the handle 23 are composed of an inexpensive material such as cardboard, paper, fiber board, or the like, so that the entire bacteria filter may be discarded from time to time and replaced with a new one. The only non-combustible material in the bacteria filter being the wire screens 21 and 22 and the staples 24, the entire filter can be conveniently and hygienically disposed of after use by burning in a furnace or incinerator.

A plurality of inwardly projecting lugs 25 are provided on the inner face of the cup shaped member 11. When the bacteria filter is inserted in the cup shaped member 11, its side walls consisting of the members 15, 16 and 17 are slightly indented to conform with the contour of the projections 25, as indicated at 26 and 27. In this manner the bacteria filter casing is snugly and tightly held in position in the cup shaped member 11.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. A bacteria filter for a vacuum cleaner comprising telescopically fitting casing members, flanges on certain of said members extending inwardly from the periphery thereof, a handle member having its ends attached to opposite sides of one of said flanges and extending across one side of said filter, a relatively fine, loosely packed, fibrous filtration medium located within said casing members, and screen members positioned adjacent the inner faces of said flanges for retaining said filtration medium within said casing.

2. In a vacuum cleaner, the combination of a cylindrical housing, a cup shaped member transversely positioned in said housing, and a bacteria filter adapted to be removably inserted in said cup shaped member, said bacteria filter comprising a casing composed of cardboard or the like, and a plurality of inwardly extending projections on the inner face of said cup shaped member, the outer diameter of said filter casing being substantially equal to the inner diameter of said cup shaped member, said casing being adapted to be slightly indented by said projections.

3. A bacteria filter for a vacuum cleaner comprising a cylindrical casing member, a pair of flanged, cylindrical, retaining members telescopically fitted over said casing member and in endwise abutment with each other, said retaining members having inwardly-extending flanges, a relatively fine, loosely packed, fibrous filtration medium located within said first-named casing member, and screen members positioned adjacent the inner faces of said flanges for retaining said filtration medium within its casing member.

HENRY A. KROENLEIN.